May 14, 1968  G. O. JACKSON  3,383,287
NUCLEAR REACTOR CORE SUPPORT STRUCTURE
Filed June 6, 1966  4 Sheets-Sheet 3
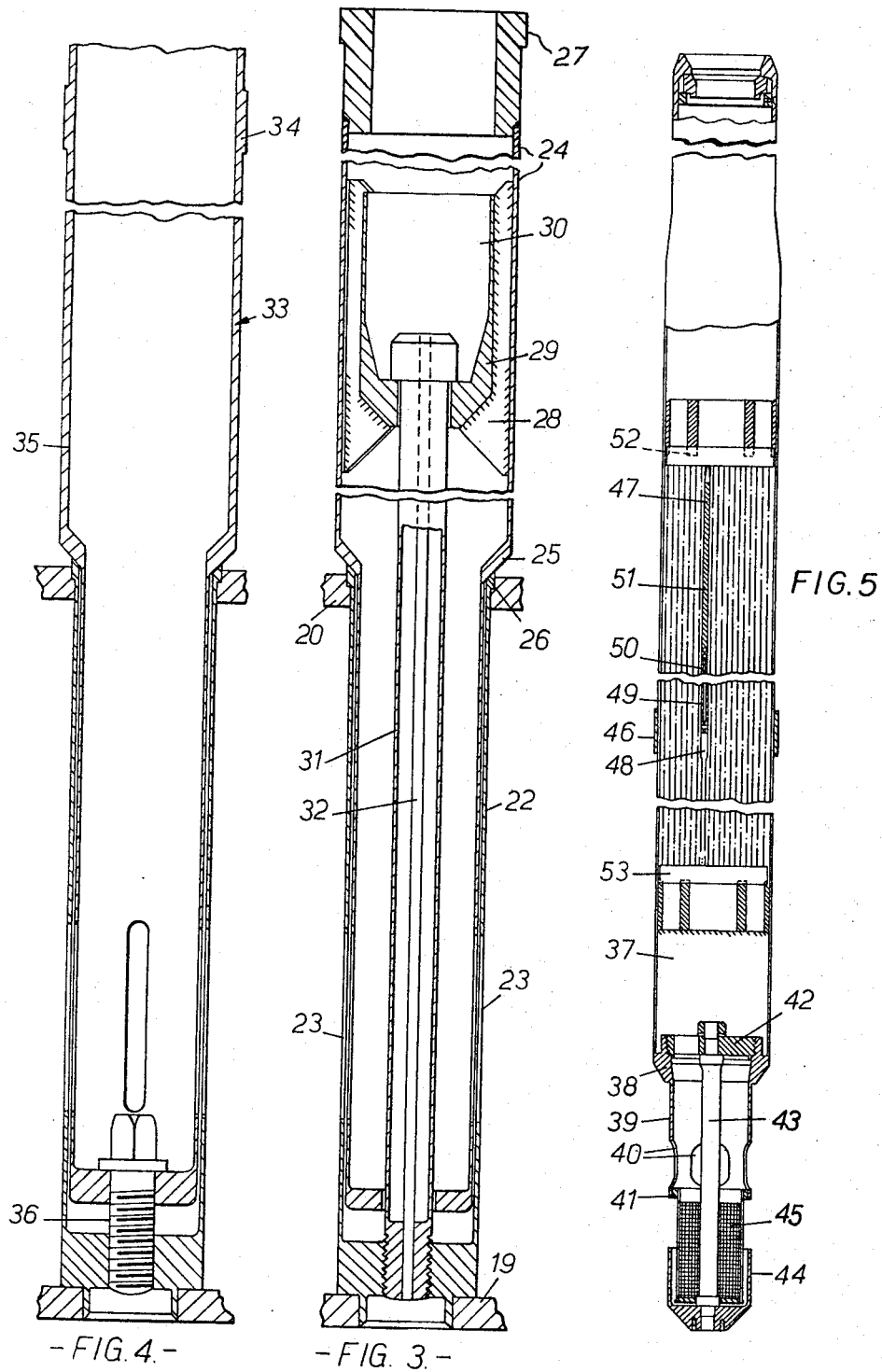

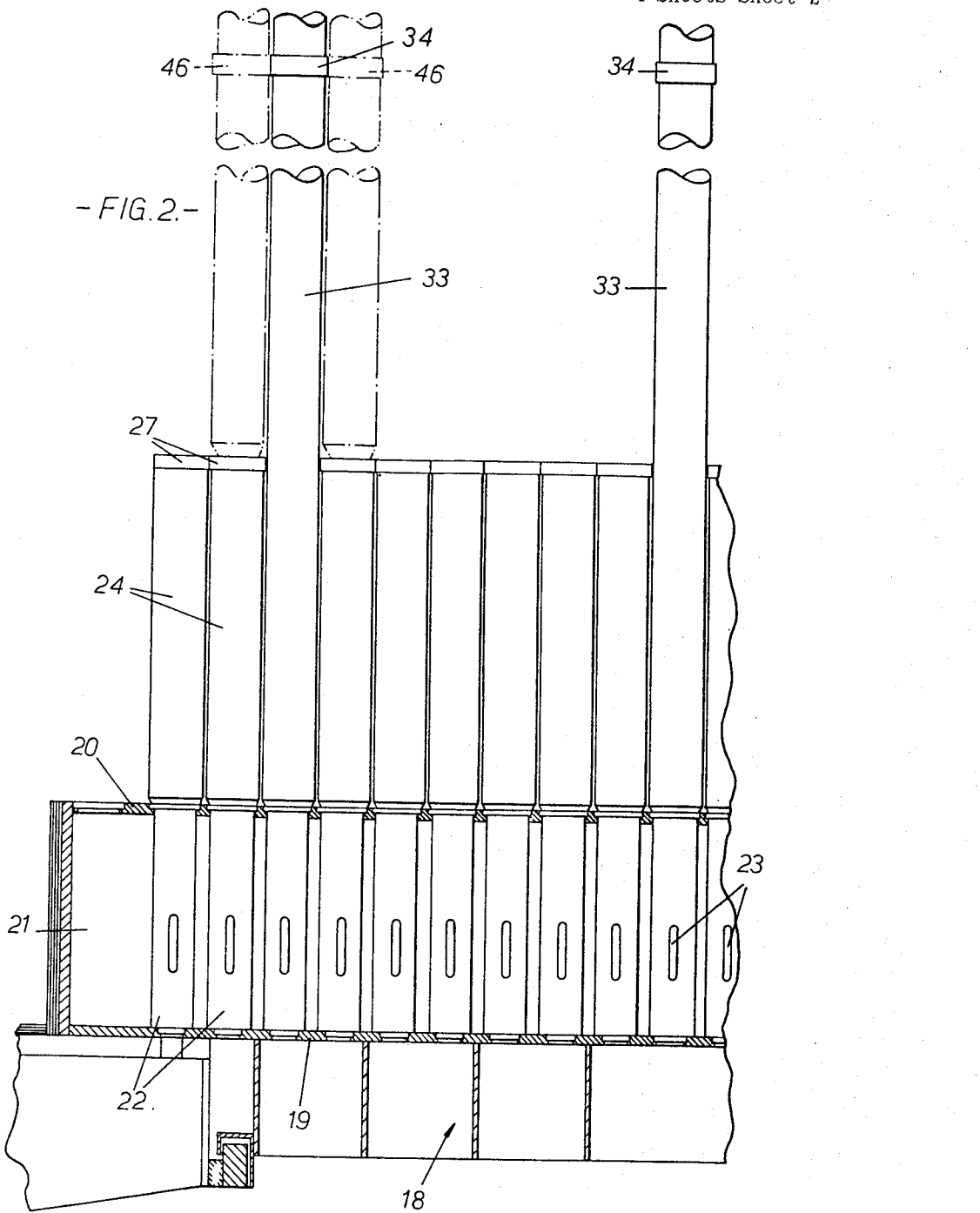

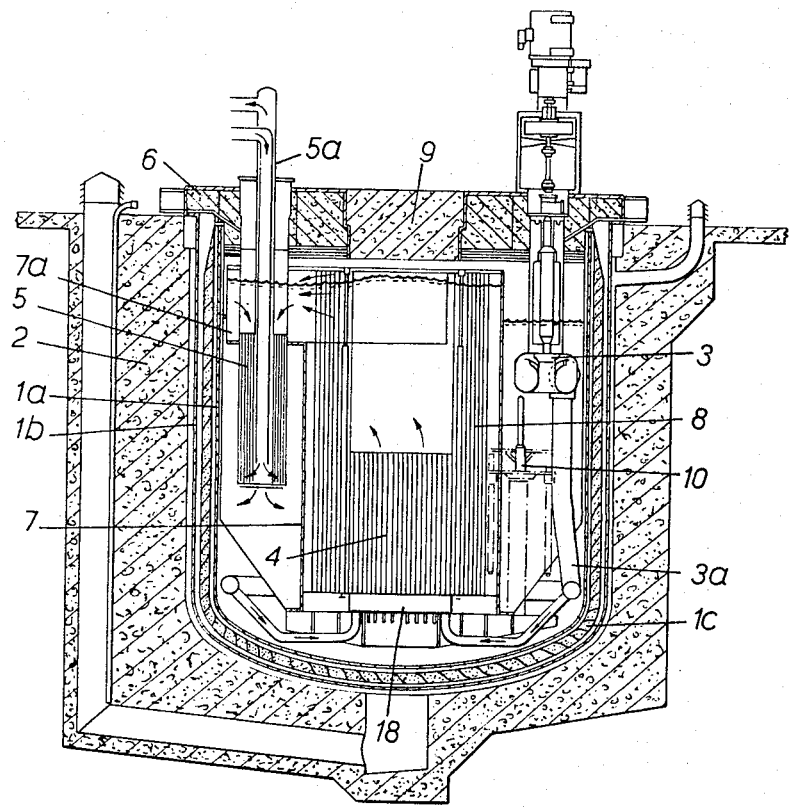
-FIG.6.-

United States Patent Office 3,383,287
Patented May 14, 1968

3,383,287
NUCLEAR REACTOR CORE SUPPORT
STRUCTURE
George Oliver Jackson, Timperley, England, assignor to United Kingdom Atomic Energy Authority, London, England
Filed June 6, 1966, Ser. No. 555,405
Claims priority, application Great Britain, June 15, 1965, 25,318/65
7 Claims. (Cl. 176—40)

ABSTRACT OF THE DISCLOSURE

In a nuclear reactor, especially one of the fast type, assemblies composed of a casing containing fuel rods or other materials necessary for the reactor core, such as reflector and breeder, are supported in cantilever fashion at their lower ends by a core support structure. For this purpose end fittings of the assemblies are inserted in sockets in the support structure. A pair of bearing surfaces in each socket co-operate with a complementary pair of bearing surfaces on the respective end fitting and the surfaces of one of the pairs are in slight axial misalignment to impose a tilting tendency on the respective assembly. The assemblies are in groups around upstanding structural members and the tilting tendency is towards the respective member to achieve firm engagement with the member.

---

Figure 1:
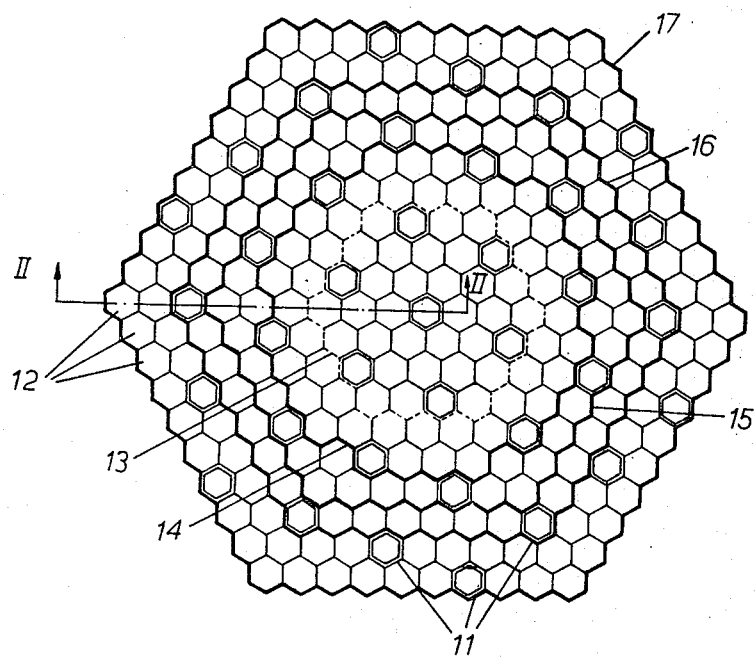

The present invention relates to nuclear reactors of the kind having a core composed of closely packed parallel fuel elements; such elements may be fuel assemblies in which a number of fuel rods are carried in parallel array within a tubular casing. Close packing of such fuel assemblies is to be found in cores without fixed moderator, that is to say, fast reactor cores and cores cooled by moderating liquids, such as in pressurised and boiling water reactors.

It is of course desirable that the elements closely packed in the core should be firmly positioned against rattling with one another. Rigid location in bearings at spaced points, such as at opposite ends, may not suffice for long elements and is not satisfactorily applicable to elements which are supported in cantilever fashion. Bearing in mind that the elements are intended to be replaceable, rigid location calls for fine tolerances which may be attainable only with difficulty and therefore at considerable expense. Pads may be provided at one or more selected levels on the elements so that all the elements interengage through these pads; however, if these pads are unyielding, stressing occurring as a result of temperature changes will be cumulative across the core and may have to be borne by the elements themselves; if the pads are resilient, there is some latitude of positioning and therefore less of a guarantee on how exactly the fuel elements lie.

According to one aspect of the present invention, in a nuclear reactor core composed of closely packed fuel elements, each of the elements in each of several groups is supported in such manner as to tend to tilt the element towards the centre of the respective group, whereby the elements of each group are urged laterally into firm engagement either with one another or with a structural member around which the group may be arranged. Underlying the invention is the idea of jamming groups of elements together, possibly against a post around which they are clustered. Preferably all the elements in the core are in groups of this sort. It is convenient to use structural members which are required in the core in other roles, notably guide tubes in which control elements are insertable for controlling the reactivity of the core. It will be appreciated that by means of the invention, there is positive location of the fuel elements only in groups and that a cumulative effect of thermally-induced stresses can be avoided.

With cantilever supported elements having an unfuelled length adjacent the supported end, it is preferred that the engagement pertains only in the region where the fuelled and unfuelled lengths adjoin. An object of the cantilever type of support is that the free ends of the elements shall be free to splay if there is a radial temperature gradient in the core tending to bow the elements convexly inwards. By arranging that the engagement is where the fuelled and unfuelled lengths adjoin, it is ensured that there is no interference with the freedom of the elements to splay apart in the event of bowing tendencies.

In the case of a core support having sockets in which to receive the fuel elements the tilting tendency may be produced by some small degree of misalignment at the bearing surfaces by which the elements are located in the sockets. Preferably the misalignment is in the bearing surfaces of the sockets rather than in the bearing surfaces of the fuel elements; were the reverse to be the case, the invention would provide, according to another aspect, a fuel element in which bearing surfaces for location of one end of the element in a socket are out of axial alignment. Such a fuel element conveniently has an end fitting including a bearing bush carried eccentrically of the element by a bending bar, there being also a concentric bearing surface so that when the eccentric bush and the concentric surface are located in a socket the bar is bent to impose a tilting tendency on the element. The invention will be further described with reference to the particular embodiment in a sodium-cooled fast reactor core which is illustrated, merely by way of example, in the accompanying drawings, in which:

FIGURE 1 is a schematic plan view of the core,
FIGURE 2 is a view of a lower part of the core taken on the line II—II of FIGURE 1,
FIGURES 3 and 4 show details of the construction of the core support structure,
FIGURE 5 shows in longitudinal section a fuel element in the form of an assembly of enriched fuel rods, and
FIGURE 6 is a diagrammatic section through the reactor as a whole.

Briefly, and with reference to FIGURE 6, a tank having double walls 1a and 1b with an interlayer of thermal insulation 1c is situated in a vault bounded by biological shielding 2 and contains the so-called "primary circuit" submerged in a reservoir of the primary coolant, that is to say, sodium. The primary circuit comprises a plurality of pumps, of which one is shown at 3, which draw coolant from the reservoir and pass it through pipework 3a to the core 4 via an inlet plenum incorporated in a core support structure 18 in a manner to be described in greater detail subsequently; finally, there is included in the primary circuit a plurality of heat exchangers, such as the one shown at 5, in which the coolant leaving the core passes through tubes before returning to the reservoir, these tubes being within a shell to which coaxial ducting 5a is so connected that a secondary coolant is admitted to the bottom of the shell through the inner duct for upward heat exchange flow over the tubes and return through the outer duct.

The heat exchangers 5, as also the pumps 3, are suspended from a biological shield roof 6; to provide access to the heat exchangers for the primary coolant leaving the core, a reactor jacket 7 upstanding on the core support structure 18 has at its upper end a laterally projecting tray 7a and the heat exchanger shells fit through apertures in the floor of this tray, the shells being of openwork construction above the tubes so that the primary coolant can gain entry to the tubes. In reaching the tray, the primary coolant has to pass between neutron shield rods 8 which are arranged on a regular lattice pitch in an annulus interposed between the core 4 and the jacket 7.

To enable handling fuel elements or assemblies of which the core is composed, a rotary shield 9 is included in the roof 6 and handling equipment (not shown) is provided on this shield. In broken outline there is shown at 10 a fuel transfer rotor or magazine which can be used as a temporary storage.

As seen in FIGURE 1, the core plan has a generally hexagonal outline within which are 91 positions on a triangular lattice for receiving closely packed hexagonal assemblies. There are only 78 assemblies, the remaining vacant positions (identified by double line hexagons as indicated as 11) being evenly distributed in such a manner that all the assemblies with the exception of only a few situated at the outer perimeter, such as those indicated 12, are in groups of six clustered around a vacancy.

A central zone of the assemblies bounded by the broken line 13 contains fuel of a lower enrichment than fuel contained in the assemblies in the next zone between the line 13 and the heavy line 14, this difference of enrichment being aimed to provide a flatter power distribution. In the zone between the line 14 and the next heavy line 15, the assemblies contain neutron reflecting material constituted principally by graphite. Similarly, the outer zone between the heavy lines 16 and 17 is a reflector zone, while in the zone between the lines 15 and 16 the assemblies contain breeder fuel.

All of the assemblies are identical to the extent that they have outer hexagonal casings of the same size. How the contents previously specified are carried in these casings is not immediately relevant. The assemblies are supported in cantilever fashion at their lower ends by the core support structure 18 (FIGURE 2). Considered generally, this structure has lower and upper plates 19 and 20 defining between them an inlet plenum 21 to which the primary coolant for cooling the core is pumped. The plates are joined together by tubes 22 at each of the 91 positions described with reference to FIGURE 1, these tubes each having a symmetrical arrangement of slotted apertures 23 for the entry of coolant from the inlet plenum 21. To form above the upper plate 19 a socket extension in which to receive an assembly, each of the tubes 22 at the 78 assembly positions has fixed therein a second tube 24 the details of which are better seen in FIGURE 3. Below a shoulder 25 which seats on a conical lip 26 of the tube 22, the second tube 24 is a sliding fit in the tube 22 and has slotted apertures coinciding with the apertures 23. Above the shoulder 25, the tube 24 terminates at its upper extremity with a concentric bearing collar 27 and carried inside by a spider 28 is a cup 29 presenting an eccentric cylindrical bearing surface 30. A hollow bolt 31 with a fine bore pipe 32 extending from top to bottom is screwed into the bottom of the tube 22 to hold the two tubes together.

The 13 positions of the core previously described as vacancies have structural members fitted in them. The roles of these members are various depending on the position in the core, but principally they are guide tubes for the insertion of control elements, whether for the purpose of operational reactivity control or shut down. Thus, although the heights of these members may be various, they all have in common the feature of a lower length 33 which has an outer diameter corresponding to that of the tubes 24 above the shoulder 25, there being carried at the upper end of this length a circumferentially extending pad 34. Referring to FIGURE 4 it will be seen that this lower length of structural member 33 is provided by a tube 35 which is a simplified form of the tube 24 in FIGURE 3, a shorter bolt 36 being used to hold the tube 35 in the associated tube 22.

For fitting into the sockets formed by the tubes 24 above the upper plate 20 of the support structure 18, the 78 assemblies each have an end fitting which in all case is at least basically the same as for the enriched fuel containing assemblies and can therefore be described with reference to FIGURE 5. The hexagonal outer casing 37 of the assembly is fixed to a ring 38 having a cylindrical skirt 39, with apertures 40, which at its free end presents a bearing surface 41 concentric with the axis of the assembly. Supported by a ported plate 42 screwed into the ring 38, is a bending bar 43 which at its free end carries also, concentrically, a bearing bush 44; a filter sleeve 45 of stainless steel gauze is interposed between the bush and the skirt 40 to strain off solid particles the coolant which enters the assembly in this region.

Near the mid-length of the outer casing 37, there is provided around the latter a pad 46. The positioning of this pad is the same for all the assemblies but is determined with reference to the fuel rods in the enriched fuel assemblies. There are 325 of these rods in each such assembly; they are in parallel array on a triangular lattice; the one appearing in section at 47 shows how a void length 48 amounting to nearly half the rod length to act as a reservoir for released fission product gases is arranged adjacent the end fitting. Beyond this void unfuelled length there is a lower axial breeder fuel section 49, an enriched fuel section 50, and an upper axial breeder fuel section 51. Each of the sections 49 and 50 has the fuel in the form of hollow pellets. The sheathing of the rods is of reduced diameter over the void length 48 to reduce the pressure loss in the coolant forced through the assemblies.

The rods float between top and bottom support plates 52 and 53 and are spaced between these plates by grid structures (not shown).

It is where the fuelled and unfuelled lengths of the rods adjoin that the pads 46 are positioned, that is to say, between the length 48 and the section 49.

The assemblies, as represented by the enriched fuel assembly depicted in FIGURE 5, are charged from above into the respective socket extensions 24 of the support structure 18 (FIGURE 2). The eccentricity of the cylindrical bearing surface 30 is away from the nearest structural member 33 so that when an assembly becomes located by this bearing surface 30 the lower end of the bending bar 43 is displaced away from the centre of the assembly group including the assembly in question. In the vacancy surrounded by such group stands the structural member presenting the pad 34 and the flexing of the bending bar 43 due to its lower end being offset outwards relative to the location of the bearing surface 41 in the collar 27 causes the pad 46 of the assembly to be urged into firm engagement with the pad 34 when the assembly is fully home in the socket extension 22, the pads 34 being arranged at a level corresponding to that of the pads 46. In respect of the illustrated construction where there the overall length of the bending bar is about 15 inches the eccentricity of the cylindrical bearing surface 30 is 0.033 inch. It is intended that the force necessary to bring an assembly to the fully home position should be less than the dead weight of the assembly. The relationship of the assemblies, when positioned in the core, with their respective structural members 33 is illustrated by the broken line assemblies appearing one to either side of the structural member on the left hand side of FIGURE 2; from FIGURE 1 it will be appreciated that the assembly seen to the right of the member is in the inner reflector zone, and therefore has a reflecting content, while the assembly seen to the left is in the outer reflector zone and therefore likewise has a reflector content.

In passing, mention should be made of the manner in which the assemblies are held in position in the core against the upward force of the coolant being forced therethrough. Having passed through the slotted apertures 23 into the tubes 24 (FIGURE 3), the coolant can enter the end fitting of the assembly through the filter 45 (FIGURE 5) and so proceed upwardly inside the assembly over the components therein. The fit of the bearing bush 44 on the bearing surface 30 in the cup 29 is such that a restricted flow of coolant can seep down to the bolt 31 and so find its way through the fine bore pipe 32 to the underside of the plate 19 of the support structure 18. The severe drop of coolant pressure across the bearing bush 44 results in a so-called "hydraulic hold-down" of the assembly. The apertures 40 in the skirt 39 provide an alternative entry for coolant in that, if the filter 45 should become blocked, coolant can be drawn from adjacent assemblies through their own apertures 40.

Regarding the assemblies, such as 12 (FIGURE 1), which are excluded from the grouping in sixes, the eccentricity of the respective cylindrical bearing surfaces 30 is orientated to urge the respective pads 46 in the general direction of the core centre so that firm engagement pertains between these pads and the corresponding pads of adjacent assemblies. This illustrates variants attainable within the scope of the invention: Thus, assemblies in a second row around the structural member may be forced towards the latter or, more generally speaking, each group may be made up of a plurality of rows. The assemblies could simply be forced against one another, rather than against a structural member, and with this arrangement the group of assemblies forced together could each be a cluster of two, three or even four neighbouring assemblies, or could each be a cluster including a central assembly in which case the number would be seven or could be even more.

What I claim is:

1. In a nuclear reactor core composed of closely packed elongated fuel elements of which at least some form a plurality of groups on different centers, a fuel element support, and means associated with said support for exerting individually on each of the fuel elements of the groups a positive lateral component of force for directly imposing tilt on each element towards the center of its respective group, in such a manner as to establish firm interengagement of the fuel elements in groups for avoiding cumulative stressing across the entire reactor core from temperature changes.

2. A nuclear reactor core composed of closely packed elongated fuel elements and comprising upstanding structural members constituting fixtures in the core, a group of the elements being arranged around each structural member, and fuel element support means to establish individually with each of the elements a cooperative relationship which imposes on each element of each group an individual tilting tendency toward the respective structural member of its group, whereby to establish firm interengagement of the elements and the respective structural elements in groups and avoid cumulative stressing across the entire core resulting from temperature changes.

3. A nuclear reactor core according to claim 2, wherein the structural members are guide tubes into which control elements are insertable for controlling the reactivity of the core.

4. A nuclear reactor core according to claim 2, wherein said support means holds the fuel elements at one end and provides the sole support whereby the fuel elements are supported in cantilever fashion, and wherein the fuel elements have an unfuelled length adjacent said one end and are adapted to confine said interengagement to a region situated where the fuelled and unfuelled lengths adjoin.

5. A nuclear reactor core comprising elongated fuel elements each having an end fitting at one end, a pair of bearing surfaces included in each end fitting and spaced apart axially of the element, a core support structure having sockets to receive the end fittings and thereby to support the elements in cantilever fashion in closely packed relationship, and a pair of bearing surfaces provided in each socket to cooperate respectively with the bearing surfaces of the end fittings, the surfaces of one of the pairs of each of the cooperating bearing surface pairs being in slight axial misalignment to impose on the respective element a tilting tendency to establish firm interengagement of the elements.

6. A core according to claim 5, wherein the misalignment is in the pair of bearing surfaces of each socket.

7. A core according to claim 5, wherein one of the bearing surfaces of each end fitting is carried by a bending bar.

References Cited

UNITED STATES PATENTS

| 3,049,485 | 8/1962 | Tatlock et al. | 176—40 |
| 3,166,481 | 1/1965 | Braun | 176—50 |
| 3,206,370 | 9/1965 | Campbell et al. | 176—40 |
| 3,260,649 | 7/1966 | Jens et al. | 176—40 |

FOREIGN PATENTS 852,206  10/1960  Great Britain.

REUBEN EPSTEIN, *Primary Examiner.*